2,760,902

VITAMIN $B_{12}$ RECOVERY PROCESS

Marshall F. Humphrey, Terre Haute, Ind., assignor to Chas. Pfizer & Co., Inc., Brooklyn, N. Y., a corporation of Delaware No Drawing. Application May 4, 1953,
Serial No. 352,983

4 Claims. (Cl. 167—81)

This invention is concerned with a process for the recovery and purification of vitamin $B_{12}$. In particular it is a method for adsorbing the vitamin from crude solutions thereof and eluting the product in a highly efficient manner from the adsorbate.

Various methods have been proposed from time to time for the purification of vitamin $B_{12}$. Many of these involve rather elaborate procedures for extraction. Certain of them involve adsorption methods. Fuller's earth and other materials of this nature are quite effective in adsorbing vitamin $B_{12}$ from dilute aqueous solutions even in the presence of considerable amounts of impurities. However, fuller's earths are not particularly selective in their adsorption of the vitamin since they adsorb a variety of impurities from the crude solutions. This is especially true of crude fermentation-derived products containing the vitamin which also contain a variety of colored organic impurities which are difficult to separate from the vitamin.

Although adsorbates of vitamin $B_{12}$ on fuller's earth have some value in the preparation of animal feeds, it is highly desirable to have an efficient method of removing the vitamin in a more purified form from the solid adsorbant. This is particularly true where it is desired to prepare pharmaceutical-grade vitamin. Here contamination with major portions of highly colored impurities is particularly undesirable.

When we refer to "vitamin $B_{12}$" we mean not only the vitamin itself but also various related compounds having the same type of biological activity and mixtures of these.

It has now been found that vitamin $B_{12}$ and the various related compounds which have vitamin $B_{12}$ activity and often occur in fermentation products (i. e. vitamin $B_{12a}$, vitamin $B_{12b}$, vitamin $B_{12c}$, etc.) may be eluted from adsorption on fuller's earth by means of dilute alkaline aqueous solutions containing sulfite ions and ammonium hydroxide. Such solutions are particularly effective as eluting agents for the recovery of vitamin $B_{12}$ from adsorption on fuller's earth. Although dilute alkaline solutions of sulfite ions have some limited value for removal of vitamin $B_{12}$ from adsorption on fuller's earth, this reagent alone is not of practical value for the large-scale recovery of the vitamin. If an attempt is made to elute the vitamin with such a solution (e. g. a dilute aqueous solution of sodium sulfite at an alkaline pH) in the absence of ammonium hydroxide, it is found that a great deal of difficulty is encountered in removing the solid from the solution. If attempts are made to filter such a mixture, it is found that a slimy film is formed on the surface of the filter medium through which the aqueous solution passes only with great difficulty. If a filter aid is used, there is no appreciable improvement in the rate of filtration. This, of course, makes it extremely difficult to handle the large volumes of solution which are essential in the commercial manufacture of vitamin $B_{12}$.

It has now been found, most unexpectedly, that the presence of ammonium hydroxide in such a solution very greatly improves the ease of filtration and the simplicity of the recovery of vitamin $B_{12}$ by this process. There is no obvious explanation for this unexpected and valuable effect. Furthermore, it has been found that although various alkaline pH's are useful for the operation of the present process, the proportion of inert impurities removed from the fuller's earth is appreciably lowered without in any way affecting the efficiency of the removal of the vitamin by operating at a pH of from about 9.5 to about 10.5 rather than at a somewhat higher pH. For instance, the process, when operated on a fuller's earth adsorbate at a pH of 10.0, yields a solution which contains 3–5% of total solids, whereas the operation at a pH of about 11, under otherwise identical conditions, yields a solution having total solids of about 9–11%. It should be pointed out that vitamin $B_{12}$ is not highly stable under alkaline conditions. The presence of ammonium hydroxide in the eluting solutions greatly increases the rate of filtration and helps in preventing decomposition of the product. After filtration, the solution may then be adjusted to a pH where the product is most stable. This effect of ammonium hydroxide on the rate of filtration and the aid of controlled basic pH's in obtaining products of unexpectedly high purity are most useful. It could not be anticipated from the known properties of crude vitamin $B_{12}$ preparations that this would occur. Furthermore, despite the highly basic pH at which the elution is operated, the stability is unexpectedly good. A recovery of approximately 95% of the vitamin is generally obtained by the operations described above.

Various materials may be used as a source of sulfite ions in the process of this invention. Most convenient are simple alkali metal sulfites which are water soluble. Alternatively, a solution of sulfur dioxide may be prepared and used after adjustment to a suitable pH. In general, a concentration of sulfite ion in the range of from about .02 to about 1% by weight of the weight of vitamin $B_{12}$ solution is satisfactory. However, more dilute or more concentrated solutions may be used in some cases. In eluting the vitamin from fuller's earth adsorbates just sufficient sulfite solution may be used so that the mixture is agitated with reasonable ease. A larger volume of solution may be used if desired, but there is no advantage to such a practice. It may be found that a second elution is required to complete the recovery of the vitamin, but this is rarely necessary. Ammonium hydroxide may be applied to the aqueous solution in the form of the concentrated solution of commerce (28% by weight) or a more dilute solution may be used if found desirable. Alternatively, anhydrous ammonia may be bubbled into the solution to bring the pH up and to furnish this material. In general, a concentration of ammonium hydroxide in the range of about 0.1 to about 1% by weight of vitamin $B_{12}$ solution is satisfactory, although higher or lower concentrations may be used without appreciable change in the efficiency of the process.

The vitamin $B_{12}$ used to prepare fuller's earth adsorbates may be obtained from various sources. The most useful are fermentation broths prepared by the growth under aerobic conditions on nutrient media of various vitamin $B_{12}$-producing organisms, such as *Streptomyces griseus* and other Streptomyces species. Alternatively, partially purified concentrates of the vitamin prepared for instance by adsorption of the vitamin on activated carbon and elution with a suitable lower aliphatic alcohol and water may be used in the present process. A concentrate prepared by extraction of animal livers may also be used as sources of the vitamin.

The purified and concentrated solutions of vitamin $B_{12}$ obtained by elution of fuller's earth adsorbates by the present process may be dried and the dried product may then be utilized in the preparation of animal feeds or in the preparation of pharmaceuticals such as multivitamin materials. Alternatively, the concentrate may be further purified by subjecting it to procedures such as adsorption on carbon and elution with water-solvent mixtures, extraction into phenolic-type solvents or into water-immiscible aliphatic alcohols, such as butanol, purification by contact with solid adsorbants, such as alumina or silica gel, and so forth. Combinations of these processes may be utilized for the preparation of high quality materials or of crystalline vitamin $B_{12}$. The product obtained by the operation of the process of this invention lends itself to the ready purification of high quality vitamin $B_{12}$ preparations.

The following examples are given by way of illustration and are not to be considered as the sole embodiments of this invention. It is to be understood that protection hereof is only to be limited by the specific wording of the appended claims.

*Example*

One thousand two hundred and fifty grams (dry basis) of fuller's earth-vitamin $B_{12}$ adsorbate which had been prepared by contacting vitamin $B_{12}$ fermentation broth with fuller's earth was stirred in two gallons of water. Ten grams of sodium sulfite were added to the stirred suspension. It was then adjusted to a pH of about 10.0 to 10.2 with 28% aqueous ammonium hydroxide. The mixture was stirred for 15 minutes and then the suspension was filtered using a diatomaceous earth filteraid. The material filtered rapidly to give a clear solution which was immediately adjusted to pH 2.5 to 3.0 with sulfuric acid. Some inactive precipitate formed at this point which may be readily removed by filtration. It was found that approximately 95% of the vitamin $B_{12}$ originally adsorbed on the fuller's earth was eluted by this procedure. Furthermore, the purity of the vitamin $B_{12}$ in the eluted solution had been increased several times over that present in the fermenation broth, many of the dark-colored impurities having been removed. This product may be dried and incorporated in medicinal products or in animal feeds.

What is claimed is:

1. A process for the recovery of vitamin $B_{12}$ which comprises contacting an impure solution of the vitamin with fuller's earth and eluting the vitamin activity therefrom with an aqueous solution containing sulfite ions and ammonium hydroxide at a basic pH substantially between 9.5 and 10.5.

2. A process as claimed in claim 1 wherein the crude vitamin $B_{12}$ solution is derived from the growth of a microorganism.

3. A process for the recovery of vitamin $B_{12}$ which comprises contacting a fuller's earth adsorbate of a crude solution of vitamin $B_{12}$ derived from the growth of a microorganism with a solution of sodium sulfite and adjusting the pH to approximately 10 with ammonium hydroxide, separating the fuller's earth from the purified vitamin $B_{12}$ solution and recovering the vitamin $B_{12}$ therefrom.

4. A process for the elution of adsorbed vitamin $B_{12}$ from fuller's earth which comprises contacting the adsorbate with a basic aqueous solution containing sulfite ions and ammonium hydroxide at a pH substantially between 9.5 and 10.5.

References Cited in the file of this patent

UNITED STATES PATENTS

| 2,407,096 | Pfiffner | Sept. 3, 1946 |
| 2,643,210 | Kutosh | June 23, 1953 |

OTHER REFERENCES

Prier: Archives of Biochemistry and Biophysics, vol. 40, October 1952, pages 474, 475, 476.

Smith: Proceedings of the Biochemical Society in the Biochemical Journal, vol. 48, April 1951, pages L, LI.

Loy: Journal of the Association of Official Agriculture Chemists, vol. 35, February 15, 1952, pages 169–174.